United States Patent Office 3,418,961
Patented Dec. 31, 1968

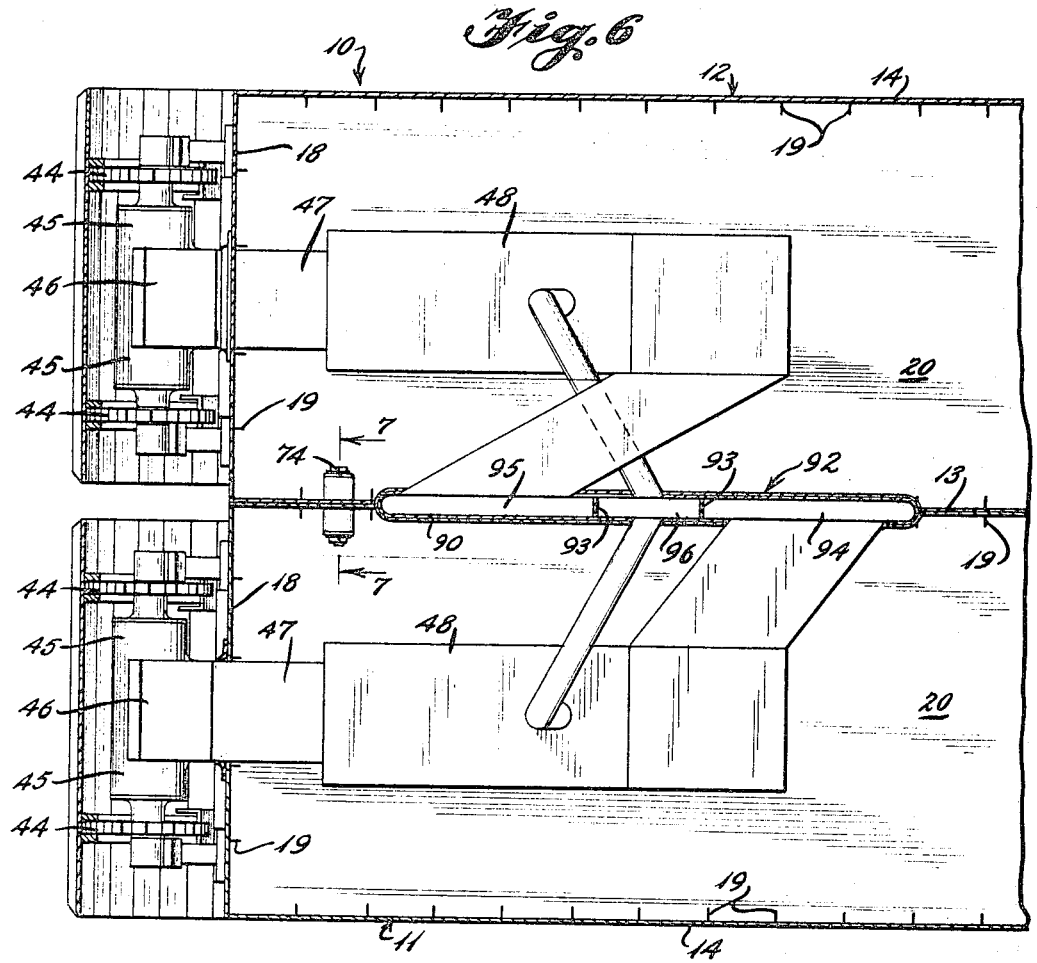
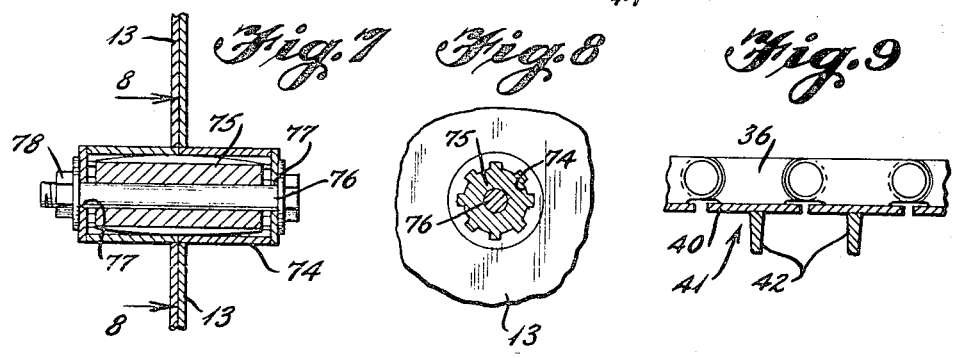

3,418,961
SWAMP CLEARING MACHINE
Frederick Browne Gregg, Leesburg, Fla., assignor to Gregg Gibson & Gregg, Inc., Leesburg, Fla., a corporation of Florida
Filed Mar. 17, 1967, Ser. No. 623,874
13 Claims. (Cl. 115—1)

ABSTRACT OF THE DISCLOSURE

A relatively large amphibious machine of two separable watertight units joined together for clearing a swamp of trees and underbrush. Each unit has an indepedent power plant controlled from a remote cab for driving an endless track extending entirely around and substantially entirely across the unit and pump means for adding and removing additional weight. A pusher bar on the front of the unit pushes down trees which are then embedded in the earth by the weight of the machine.

Background of the invention

*Field of the invention.*—The invention pertains to motor vehicles of the amphibious type which are adapted to travel upon a track carried by the vehicle. The vehicle is relatively large and is adapted to travel on land, water, or a combination thereof while performing the function of clearing trees and underbrush.

*Description of the prior art.*—The prior art has many amphibious vehicles or so-called "swamp buggies" which operate on land or water; however, these vehicles are usually relatively small and are used merely to transport one or more persons through the swamp for sports, surveying or other purposes. These vehicles are used primarily in clear areas and have been unable to penetrate wooded areas or areas of thick underbrush. Also, the military has developed certain armored vehicles which have been classified as amphibious; however, their primary function is on land. Many of these vehicles have operated satisfactorily for the purpose for which they are intended as long as they remained on water, hard ground, or sandy shores. These vehicles, however, have had trouble operating in deep mud since they neither float nor have sufficient traction to move.

Summary

The present invention is a relatively large amphibious vehicle constructed of two independent units joined together in use and provided with a pusher bar for pushing down relatively large trees having a trunk up to six feet in diameter. Each of the units has an endless track extending entirely around and substantially entirely across the same which is driven by an independent power plant in each unit under the control of an operator disposed above the units. Such units are provided with watertight compartments and a pump system which is capable of pumping water into the units to increase the weight and pumping water out of the units to increase buoyancy. The endless tracks include a plurality of shoes each of which has an outwardly extending tapered grouser which provides the motive force on both land and water. The machine is adapted to push down trees and underbrush and then roll over the same so that the weight of the machine will break off the branches and will embed the trunk and the branches in the earth.

Brief description of the drawings

FIG. 6, a section on a reduced scale on the line 6—6 of FIG. 3;
FIG. 7, an enlarged section on the line 7—7 of FIG. 6;
FIG. 8, a section on the line 8—8 of FIG. 7;
and
FIG. 9, an enlarged fragmentary section through one of the track members.

Description of the preferred embodiment

Figure 1:
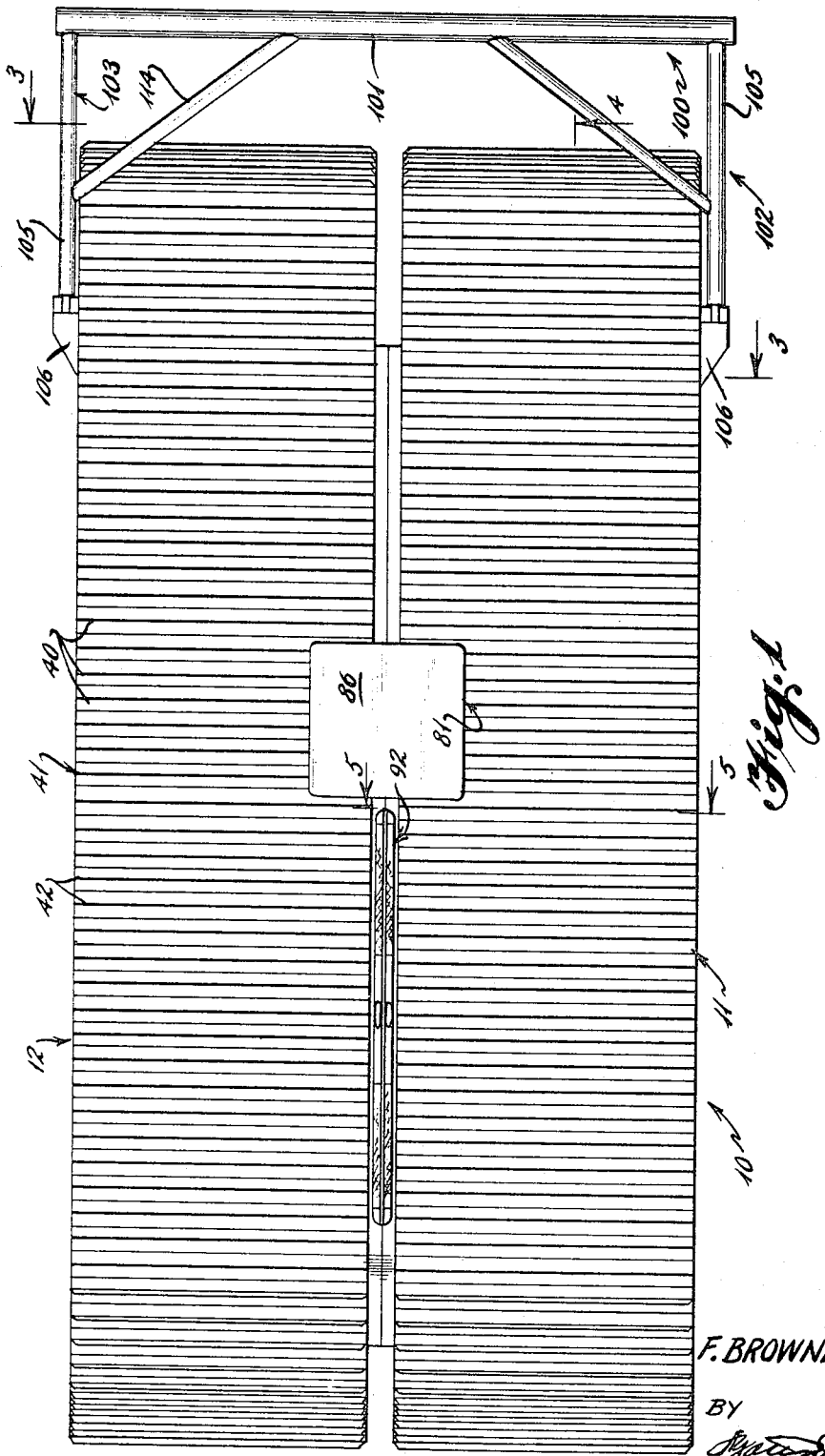
FIG. 1 is a top plan view illustrating one embodiment of the present invention.

With continued reference to the drawings, a relatively large vehicle 10 is provided which includes a pair of independent generally watertight units 11 and 12. Such units are connected together in assembled relation during operation but can be separated to facilitate transporting from one place to another. The units 11 and 12 are substantially identical except that one is a mirror image of the other to provide right and left hand units. Such units may be of any desired size; however, a unit approximately 50 feet long, 12 feet wide and 12 feet 6 inches high has been found satisfactory. Since the units are substantially identical, only one unit will be described, it being understood that like reference characters will be applied to both units.

The unit 11 includes an inner wall 13, outer wall 14, top wall 15, bottom wall 16, and front and rear walls 17 and 18, respectively. The walls 13–18 are provided with structural reinforcing members 19 and are connected together in assembled relation to provide a generally watertight compartment. Such compartment is divided vertically by a deck or floor 20 and is divided horizontally by at least one partition 21. The deck 20 and the partition 21 impart additional strength and rigidity to the unit 11. Access to and from the compartment is provided through the outer wall 14 by a hinged watertight hatch 22 having dogs 23 and through the partition 21 by a watertight hatch 24 having dogs 25. The inner wall 13 has a watertight hatch 26 having dogs 27 for providing communication between the units 11 and 12.

The bottom wall 16 has a pair of spaced stepped channels or troughs 30 extending the full length thereof and providing shoulders 31 adapted to receive a plurality of closely spaced idler support rollers 32. Each of the rollers 32 is journaled in pillow blocks or bearings 33 mounted on the shoulders 31 in any desired manner. The rollers 32 have a central enlargement 34 and flanged ends 35 for supporting and guiding an endless conveyor chain 36. In order to support the conveyor chains 36 on the top of the unit, a plurality of pairs of laterally spaced stepped wells 37 are located along the top wall 15 and each of such wells is provided with spaced shoulders 38. A roller 32 is mounted within each of the wells 37 by means of bearings 33 mounted on each of the shoulders 38. Preferably, each of the wells 37 has a drain plug 39 so that water can be removed from the wells when the vehicle is not in operation.

The pair of endless chains 36 on each of the units 11 and 12 support a plurality of elongated cleats or track members 40 each of which is approximately 11½ feet long and extends substantially entirely across the unit to form an endless track 41. Each cleat has an outwardly extending grouser or flange 42 approximately 5 inches in length which tapers from approximately 2½ inches at the base to 1½ inches at the tip. When the tracks 41 are driven, the grousers 42 provide the motive force in water or on land. In order to prevent excess deflection of the track 41, a series of skids or wear strips 43 may be located along the bottom wall 16 to support the weight of the unit between the rollers 32 and adjacent to the sides of such unit.

The endless chains 36 of each unit are driven by drive sprockets 44 located at the rear of the unit on an axle 45. The axle 45 may be driven in any desired manner as by a hydraulic drive unit, electric drive unit, or other heavy duty drive means. As illustrated, such axle is driven by a differential 46 which in turn is driven by a drive shaft carried within a housing 47 which extends through the rear wall 18. The drive shaft is driven by a power plant 48 mounted on supports 49 carried by the deck 20 within the watertight compartment. Such power plant may be of any desired construction and may be operated by electricity or by gas or diesel fuel, a Caterpillar D8H engine within each unit 11 and 12 having been found satisfactory. Normally an engine of this type is adapted to drive a pair of tracks and clutch means is provided so that the tracks can be driven at different speeds in order to control the direction of travel of the vehicle. However, in the present application, the drive sprockets must be driven simultaneously; therefore, the clutch means is pinned or otherwise fixed to the drive sprockets to insure simultaneous operation.

At the front of the unit, an idler sprocket 50 for each of the endless chains 36 is mounted on an axle 51 carried by a bearing 52. Such bearing is mounted on a slide member 53 slidably carried by a slideway 54 having one end secured within the compartment and extending outwardly thereof through the front wall 17. The slide member 53 is connected to one end of a piston rod 55, the opposite end of which has a piston located within a double acting cylinder 56 to extend and retract the slide member 53 and adjust for any unnecessary slack in the endless chains 36. The over-all length of the track 41 which extends around the drive sprocket 44 and the idler sprocket 50 is approximately 50 feet.

Each unit weighs approximately 200,000 pounds and in order to increase the weight by as much as 100,000 pounds, the area beneath the deck 20 functions as a sump or reservoir and is adapted to receive water through an inlet pipe 58 having a screened opening 59 in the side of the unit. A solenoid operated valve 60 or other control device may be disposed in the pipe 58 so that the valve can be operated from a remote position to permit water to enter the inlet pipe 58 by gravity and be discharged into the sump below the deck 20. The addition of water will increase the weight of the unit to assist in the removal of trees and undergrowth, as will be described later. In order to remove the water from the sump to increase the buoyancy, a pump 61 is mounted on the deck 20 adjacent to the power plant 48 and such pump has an impeller mounted on one end of a drive shaft 62. As illustrated, a pulley 63 is mounted on the opposite end of the shaft 62 and is driven by a belt 64 which in turn is driven by the power plant 48; however, the pump 61 could be driven in any desired manner as by a separate hydraulic motor, electric motor, or internal combustion engine. The pump is connected to a header 65 having a plurality of downwardly extending sump lines 66 which deliver water from the sump to the pump 61. Water is discharged from the pump through a discharge line 67 having a one-way check valve 68 or other mechanical means which prevents water from entering the pump when the discharge line 67 is disposed below the water line on the exterior of the unit. In order to permit the introduction and removal of water into the sump, a vent line 69 having a valve 70 is disposed on one side of the partition 21 along the inner wall 13 and extends upwardly through the top wall 15 where it is in communication with the exterior atmosphere. An auxiliary vent line 71 may be provided rearwardly of the partition 21 and such auxiliary vent line may extend through the partition and be connected to the vent line 69. If desired a pressure relief valve 72 can be located along the auxiliary vent line 71.

In order to join the units 11 and 12 together in assembled relation, each of such units may have a plurality of alignable cooperating splined recesses 74 in the inner wall 13 and such recesses are adapted to receive a splined shaft 75. A heavy duty bolt 76 or other fastening means is adapted to extend through an opening 77 in the end wall of one of the splined recesses 74 and then through the splined shaft 75 and through an opening 77 in the cooperating splined recess where it is secured by a nut or other fastening means 78.

As illustrated in FIG. 1 the tracks 41 extend substantially entirely across the units 11 and 12 so that when the units are in assembled relation a relatively small space is provided between the tracks. Each of the units is provided along its inner wall with a pair of arcuate recesses 79 adapted to receive upstanding posts 80 which form the supports for a control cab 81. The cab 81 includes a deck 82 extending outwardly to a position overlying the tracks 39 and such deck is supported by braces 83 from the posts 80. Preferably the cab includes protective panels 84 having screened openings 85 in the upper portion and covered by a roof 86. The cab contains an operating panel (not shown) from which an operator can control the power plant 48 and the other working elements such as pumps, valves, etc. located within the units.

In order to supply oxygen to support combustion within the power plants 48 and to discharge air and the products of combustion from the units, each of the units is provided with an elongated offset recess 90 located rearwardly of the arcuate recesses 79. Each of the recesses is provided with an opening 91 into the unit 11 or 12. A relatively narrow elongated air intake and exhaust member 92 is disposed within the recesses 90 and such member is provided with a pair of partitions 93 which separate the member 92 into front and rear intake ducts 94 and 95 and an intermediate exhaust duct 96. The front duct admits air into one of the units and the rear duct admits air into the other unit while the exhaust duct is connected to the exhaust of both power plants 48 to remove carbon monoxide, smoke and other products of combustion from the power plants.

Figure 2:
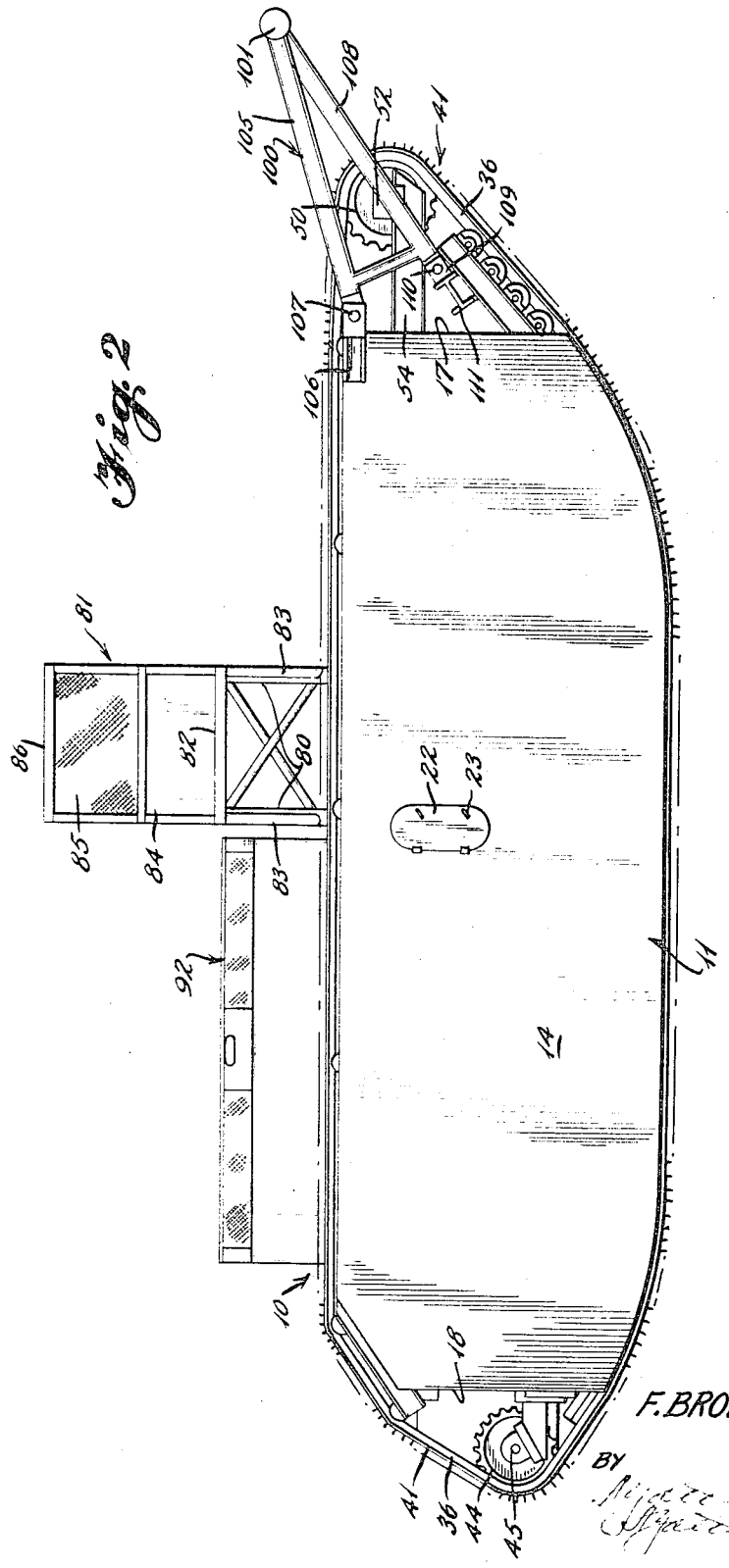
FIG. 2, a side elevation thereof.
Figure 3:
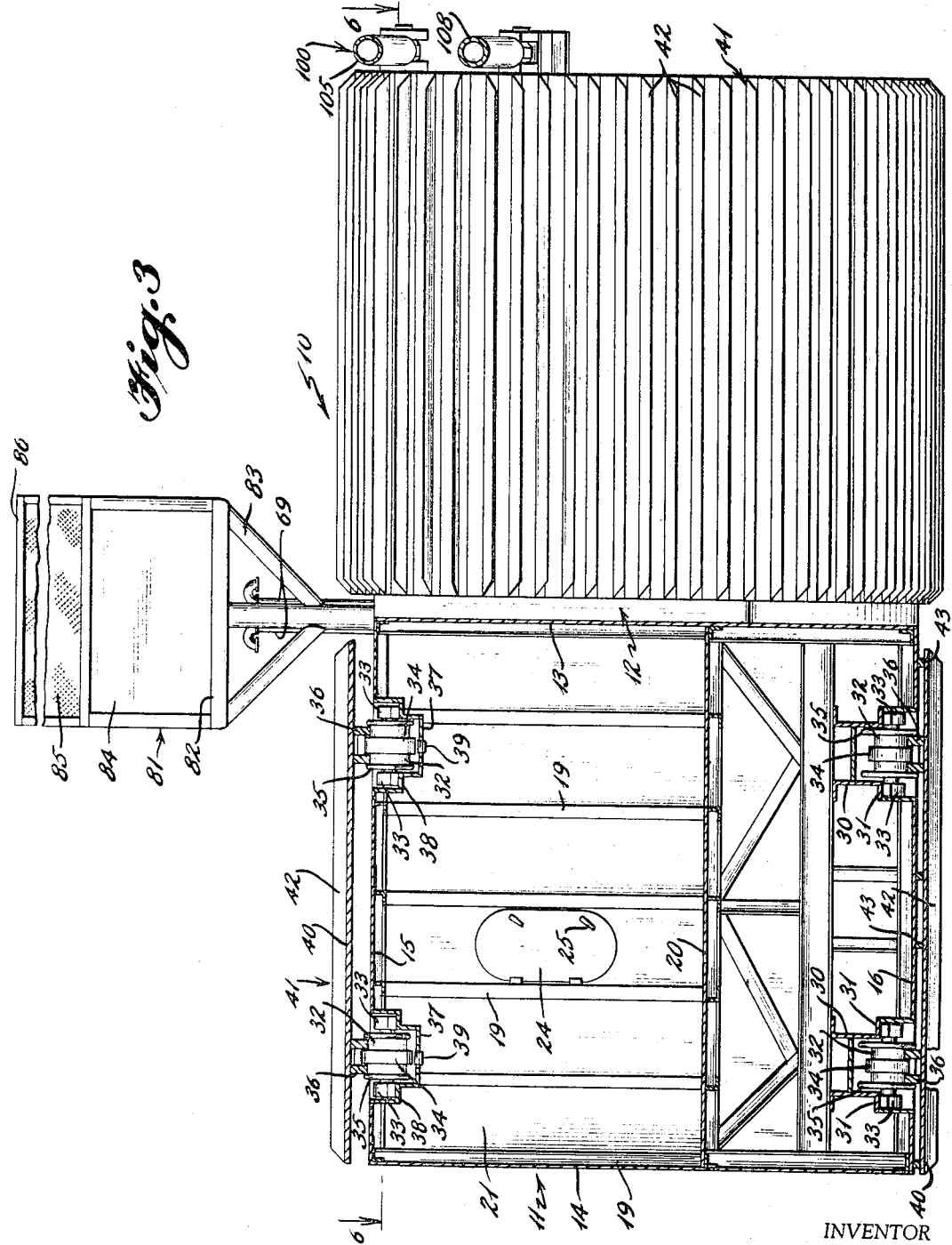
FIG. 3, an enlarged front elevation with portions broken away for clarity.
Figure 4:
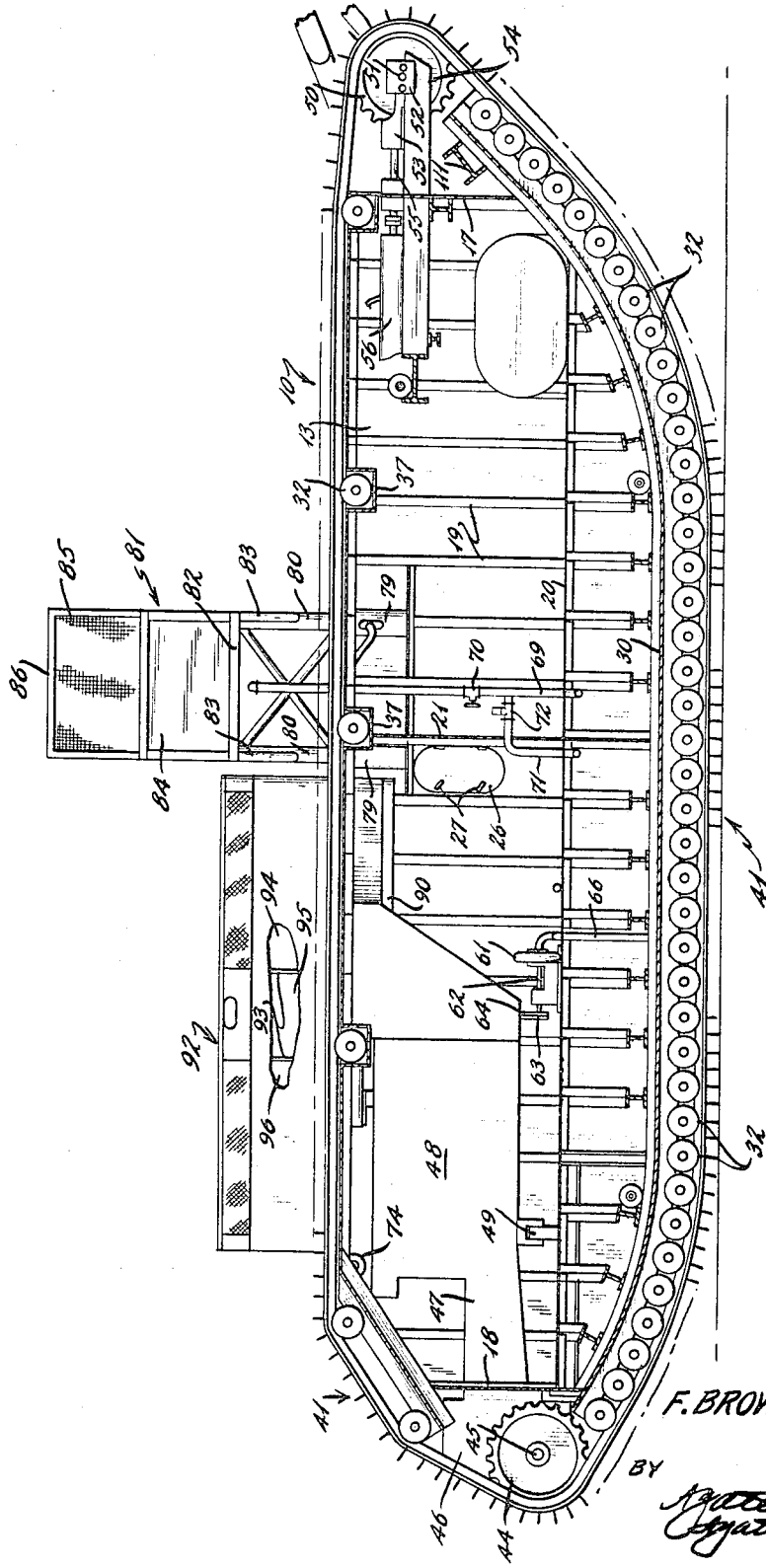
FIG. 4, a vertical section to a reduced scale on the line 4—4 of FIG. 1.
Figure 5:
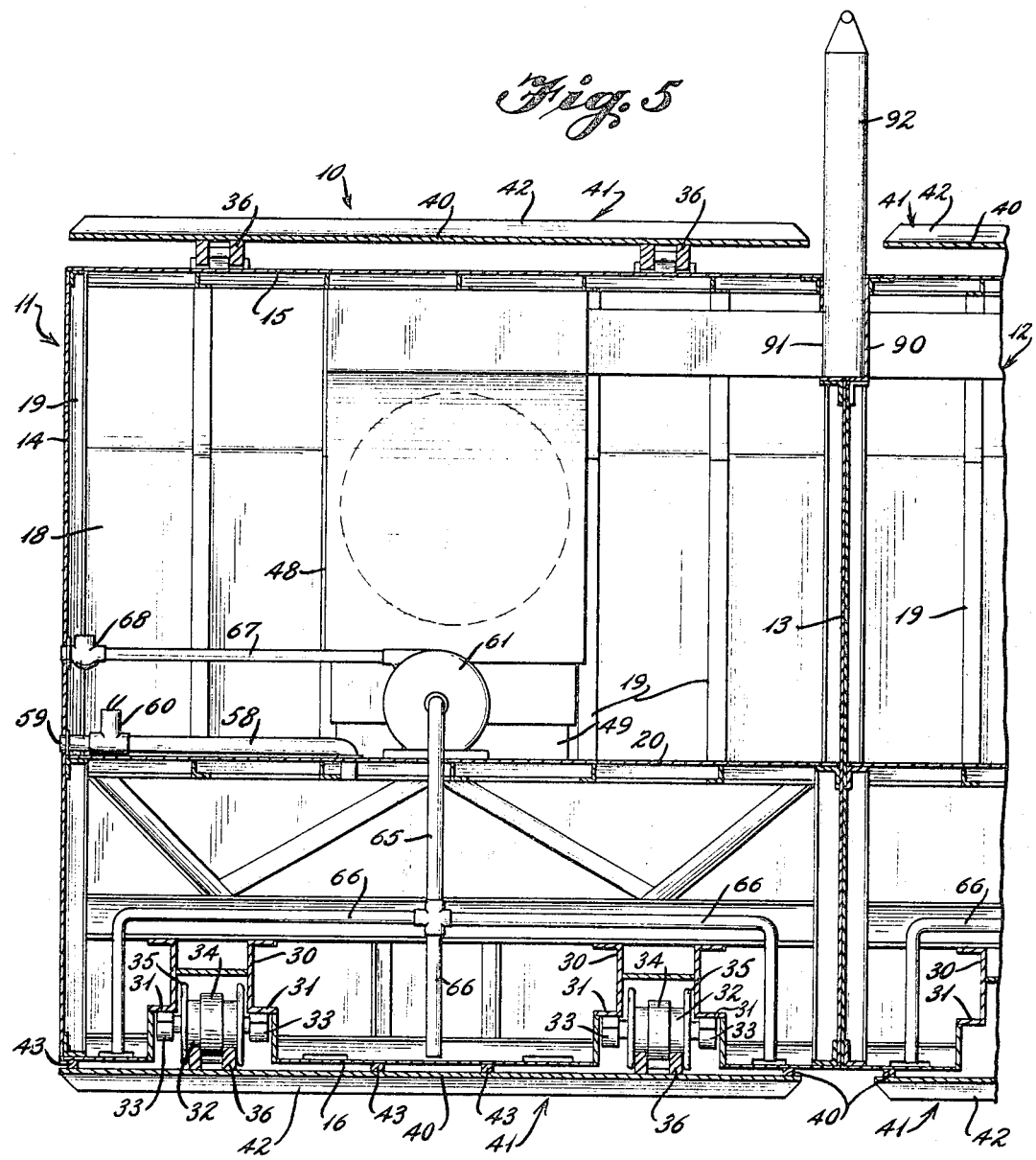
FIG. 5, an enlarged vertical section on the line 5—5 of FIG. 1.

As illustrated in FIGS. 1 and 2 a pusher bar assembly indicated generally at 100 is mounted on the front of the vehicle 10 and extends substantially 5 feet forwardly thereof. The pusher bar includes a contact member 101 located approximately 15 feet above the bottom of the vehicle and which extends entirely across the vehicle 10. Such member is supported by a pair of A-frames 102 and 103 at opposite sides of the vehicle. The upper leg 105 of each of the A-frames 102 and 103 is connected to a bracket 106 by a pin 107, such bracket being welded or otherwise attached to the upper forward portion of the outer wall 14 of each of the units. The lower leg 108 of each of the A-frames 102 and 103 is mounted on a bracket 109 by a pin 110, such brackets being welded or otherwise attached to a structural beam 111 mounted on extensions 112 of the channels 30. If desired, cross braces 114 may extend from the A-frames 102 and 103 to the contact member 101 to strengthen such contact member and to make the same more rigid. It is noted that although the pusher bar assembly 100 has been illustrated and described as being fixed, such pusher bar assembly could be adjustable by providing pivots for the upper legs of the A-frames and providing fluid cylinders pivotally mounted on the vehicle 10 and having a piston rod connected to the lower legs of the A-frames so that when the piston rods are extended or retracted the A-frames will pivot about the pivotal connection of the upper leg to raise and lower the contact member 101.

In the operation of the device the units 11 and 12 can be transported separately to a job site in any desired manner, as by barge, railway flat car, flat bed truck, or in any other known manner. The units are then placed in the water of a swamp or the like so that the units will float and can be readily aligned with each other. A splined shaft 75 is placed within each of the splined recesses 74 of one of the units and thereafter the units are moved toward each other so that the splined shafts are received within the splined recesses of the other unit after which the bolts 76 are passed through the shafts and the openings 77 and are secured by nuts 78. The upstanding posts 80 of the control cab 81 are then received within the arcuate recesses 79 and the electrical connections are joined between the control cab and the individual units. Thereafter the intake and exhaust member 92 can be placed within the recesses 90 and the pusher bar assembly 100 can be connected to the mounting brackets at the front of the machine. After the device has been assembled, the power plants 48 in each of the units are started and by regulating the speed of the power plants, the vehicle 10 is moved through the water by rotating the tracks 41 so that the grousers or flanges 42 will function as paddle wheels to produce propulsion through the water. The operator can maneuver the vehicle to an island or hummock or which trees and underbrush are growing. As soon as the tracks 41 engage earth or the bottom close to the trees to be removed, the operator can stop the vehicle, open the valve 60 of the inlet pipe 58 to permit water to enter the compartments and thereby substantially increase the weight of the units. As soon as sufficient weight has been added the drive sprockets 44 are again engaged and the vehicle will move forwardly until the pusher bar 100 engages the tree. Since the pusher bar will be located substantially 15 feet above the ground, continued forward movement of the vehicle will cause the tree to be pushed down after which the vehicle will drive over the trunk of the tree and embedded the tree in the earth by weight. Any underbrush or small trees which are to small to be engaged by the pusher bar will merely be crushed as the vehicle passes over the same.

It will be obvious to one skilled in the art that various changes may be made in the invention without departing from the spirit and scope thereof and therefore the invention is not limited by that which is illustrated in the drawings and described in the specification, but only as indicated in the accompanying claims.

What is claimed is:

1. An amphibious vehicle for use on land or water comprising a unit including a watertight portion, a pair of endless tracks extending entirely around and substantially entirely across said unit, said tracks having a narrow space therebetween, means for independently driving said tracks, means for controlling said driving means, and means for selectively introducing a flowable mass into said portion to selectively increase the weight thereof, and means for selectively removing said mass from said portion to decrease the weight, whereby said vehicle can operate on land or water and can add or remove additional weight.

2. An amphibious vehicle comprising a pair of independent watertight buoyant units joined together in adjacent assembled relation, an endless track extending entirely around and substantially entirely across each of said units, said tracks having a narrow space therebetween, means for independently driving said tracks, means for controlling said driving means, and means for selectively introducing and removing a flowable mass into and from at least one of said units to selectively increase or decrease the weight thereof, whereby said vehicle can operate on land or water and can add or remove additional weight.

3. The structure of claim 2 in which the means joining said units together can be removed to separate the units when not in use.

4. The structure of claim 2 including pusher bar means mounted on said vehicle and extending forwardly thereof for engaging trees so that said vehicle can push down such trees.

5. The structure of claim 2 in which said means for driving said tracks includes an independent power plant in each of said units.

6. The structure of claim 2 in which said means for controlling said driving means includes a control cab supported by posts disposed in said narrow space between said tracks, said cab extending outwardly to a position overlying said tracks.

7. An amphibious vehicle for clearing an area of trees and underbrush comprising a vehicle including a pair of independent units, means for joining said units together in assembled relation when in operation and adapted to be separated when not in use, each unit having wall structure defining a hollow watertight compartment, endless track means extending entirely around and substantially across each unit, a power plant located within each compartment for driving said endless tracks, means for connecting said units in assembled relation, means for selectively introducing and removing liquid into and from at least one of said units to selectively increase or decrease the weight thereof, and a control cab supported by at least one of said units, whereby said vehicle can operate on land or water and can add or remove additional weight to assist in the removal of trees and underbrush.

8. The structure of claim 7 including pusher bar means mounted on said units and extending forwardly thereof.

9. The structure of claim 7 including adjustable means for removing excess slack from said tracks.

10. The structure of claim 7 in which each of said units includes channel means along the bottom thereof, and a plurality of support rollers disposed within said channel means and supporting said units on said tracks.

11. The structure of claim 7 in which said power plant includes at least one drive sprocket for driving said endless track.

12. The structure of claim 7 in which said means for joining said units together includes a plurality of splined recesses in each unit with the recesses of one unit being alignable with the recesses of the other unit, a cooperating splined shaft receivable within said splined recesses, and means for connecting said splined shafts to said units to maintain said units in assembled relation.

13. The structure of claim 7 including means for introducing air into each of said units and for exhausting air and products of combustion therefrom.

References Cited

UNITED STATES PATENTS

| | | | |
|---|---|---|---|
| 2,068,664 | 1/1937 | Dorst | 115—1 X |
| 2,453,149 | 11/1948 | McCutchen | 115—1 |
| 2,546,523 | 3/1951 | Reynolds | 115—1 |
| 2,756,830 | 7/1956 | Hurthig | 115—1 X |
| 2,845,725 | 8/1958 | Robishaw | 180—9.5 X |

FOREIGN PATENTS 842,590  7/1960  Great Britain.

RICHARD J. JOHNSON, *Primary Examiner.*

U.S. Cl. X.R.

180—9.2, 9.24, 6.7; 305—17; 37—2; 73—392